United States Patent
Bliding et al.

(10) Patent No.: US 9,024,720 B2
(45) Date of Patent: May 5, 2015

(54) ACCESS CONTROL METHOD, AND ASSOCIATED LOCK DEVICE AND ADMINISTRATION SERVER

(75) Inventors: Olle Bliding, Halmstad (SE); Lars Knutsson, Halmstad (SE)

(73) Assignee: Phoniro AB, Halmstad (SE)

( * ) Notice: Subject to any disclaimer, the term of this patent is extended or adjusted under 35 U.S.C. 154(b) by 569 days.

(21) Appl. No.: 13/504,282

(22) PCT Filed: Nov. 9, 2010

(86) PCT No.: PCT/SE2010/051226
§ 371 (c)(1),
(2), (4) Date: Apr. 26, 2012

(87) PCT Pub. No.: WO2011/065892
PCT Pub. Date: Jun. 3, 2011

(65) Prior Publication Data
US 2012/0222103 A1    Aug. 30, 2012

(30) Foreign Application Priority Data

Nov. 27, 2009 (SE) ..................................... 0950904

(51) Int. Cl.
*G06F 7/04* (2006.01)
*G07C 9/00* (2006.01)

(52) U.S. Cl.
CPC ........ *G07C 9/00111* (2013.01); *G07C 9/00103* (2013.01); *G07C 9/00309* (2013.01); *G07C 9/00571* (2013.01); *G07C 9/00904* (2013.01); *G07C 2009/00793* (2013.01)

(58) Field of Classification Search
USPC ........ 340/5.6, 5.64, 5.7, 5.71, 5.72, 5.73, 5.8, 340/5.81, 5.85
See application file for complete search history.

(56) References Cited

U.S. PATENT DOCUMENTS

2002/0178385 A1    11/2002   Dent et al.
2006/0170533 A1    8/2006    Chioiu et al.
(Continued)

FOREIGN PATENT DOCUMENTS

EP    2157552 A1    2/2010
NL    1033539 C2    9/2008
(Continued)

OTHER PUBLICATIONS

European Search Report of Oct. 18, 2013 for Application No. 10833658.7.
International Search Report PCT Form PCT/ISA/210.

*Primary Examiner* — Brian Zimmerman
*Assistant Examiner* — Sara Samson
(74) *Attorney, Agent, or Firm* — Harness, Dickey & Pierce, P.L.C.

(57) ABSTRACT

An access control method is disclosed in which a lock device provides conditional access to a protected environment by short-range wireless communication with a key device having a key device identifier (KD_ID). In the method, the lock device requests the key device to provide a challenge response to a challenge generated by the lock device based on a challenge code kept by the lock device. The lock device receives the challenge response from the key device. The challenge response is generated by a remote administration server and is based on the key device identifier of the key device. The generated response is sent to the key device and forwarded from the key device to the lock device. The lock device then verifies the received challenge response based on the challenge code and on the key device identifier of the key device.

13 Claims, 6 Drawing Sheets

(56) References Cited

U.S. PATENT DOCUMENTS

2007/0290798 A1 12/2007 Larson et al.
2008/0148369 A1 6/2008 Aaron

FOREIGN PATENT DOCUMENTS

| WO | WO-02/093502 A1 | 11/2002 |
| WO | WO-02/095689 A1 | 11/2002 |
| WO | WO-2006/098690 A1 | 9/2006 |

ACCESS CONTROL METHOD, AND ASSOCIATED LOCK DEVICE AND ADMINISTRATION SERVER

FIELD OF THE INVENTION

The present invention relates to access control, and more particularly to an access control method in which a lock device provides conditional access to a protected environment by short-range wireless communication with a key device having a key device identifier. The invention also relates to a lock device for use in an access control system which involves a plurality of lock devices, a plurality of key devices, each key device having a key device identifier, and an administration server. In addition, the invention relates to an administration server having an associated system database which defines the conditions under which individual ones of the key devices may be granted access to protected environments by individual ones of the lock devices.

BACKGROUND OF THE INVENTION

Access control methods and systems are previously known in which electronic lock devices are installed at doors, gates, etc., so as to provide conditional access to protected environments. A user that seeks access to such a protected environment will use an electronic key device which will communicate with the lock device in question. Based on this communication, the lock device will decide whether or not to allow the user to access the protected environment, for instance by controlling an electro-mechanical lock which is included in or coupled to the lock device.

Generally, there are two distinctly different categories of access control systems. In the first category, the key device acts as an intermediate device to allow communication between the lock device and a remote central server. Such communication may take place over existing wide-area data and/or telecommunication networks. The outcome of this communication will determine whether or not the key device—and the user carrying it—shall be granted access to the environment protected by the lock device at any given moment.

WO 2006/098690 discloses an access control system of a second category. In WO 2006/098690, the electronic key devices are capable of short-range wireless data communication with the lock devices. Each key device has a key device identifier which is used for the short-range wireless data communication, and the lock device is configured to perform authentication of an appearing key device by detecting the key device identifier of the key device and using the detected key device identifier, together with some other parameters, to determine whether access shall be granted. Each lock device is a stand-alone device with its own internal power source and requires no wiring to its surroundings. When a key device approaches and seeks access, the lock device will communicate with the key device using short-range wireless data communication, but it will typically not need any further communication with other, more remote elements in the system, such as a central server. In order to operate autonomously, the lock device uses local lock access data which is stored within the lock device and defines the key device identifiers of key devices which are allowed to access the protected environment. In one embodiment, the key devices are mobile terminals or other similar types of portable communication devices being equipped with short-range wireless data communication interfaces in the form of Bluetooth® transceivers. Hence, the key device identifier of each key device is the unique Bluetooth® address assigned to the Bluetooth® transceiver in the key device.

In an access control system of the above second category, where the lock devices operate autonomously on locally stored lock access data, there will be an issue when it comes to providing the lock access data into the lock devices. Initially, when a new lock device is to be installed at the intended protected environment, the lock device may be programmed with certain initial lock access data, either during the manufacturing procedure, or by service personnel before or during the actual installation. This initial lock access data will then define an arbitrary number of key devices which are authorized to access the protected environment, these key devices being identified in the lock access data by their respective key device identifier (Bluetooth® address).

Once installation is completed, the autonomously operating lock device has no other contact with the surroundings, except when an appearing key device seeks access to the environment protected by the lock device. The access control system of WO 2006/098690 is therefore configured to exchange various data between key device and lock device, once the key device has been successfully authorized and a bi-directional Bluetooth® link has been established between the devices. The types of data exchanged include log file and status data recorded by the lock device regarding for instance previous attempts by key devices to access the environment protected, as well as updated lock access data intended to replace or upgrade the existing lock access data in the lock device. Such updated lock access data will have been generated by an administrator at a remote administration server and sent in advance to the key device over one or more existing communication networks such as the Internet and/or a telecommunications network. Upon receipt, the key device will have buffered the updated lock access data, waiting for an opportunity when the user of the key device approaches the lock device in question to forward the updated lock access data to the lock device.

In this way, service personnel do not have to visit the premises where the lock device is installed in order to update the lock access data. Instead, updated lock access data may be sent via the key device over existing communication networks, as mentioned above. However, this requires that the key device which visits the lock device is indeed authorized to access the protected environment; otherwise there will be no Bluetooth® link established between the devices and, consequently, no opportunity for the key device to forward the updated lock access data to the lock device. In turn, in order to be considered as authorized by the lock device, the key device identifier of the key device must be included in the current lock access data in the lock device. In other words, the key device must already be known to the lock device. Actually, in real-world implementations, not all key devices are typically allowed to bring updated lock access data to lock devices. Rather, a subset of particularly trusted key devices is designated as ambassadors; only these will be allowed to bring updated lock access data to the lock devices. Ambassador key devices may for instance be possessed and used by managers, security personnel or other trusted users in the access control system.

As time passes, any real-world implementation of an access control system will experience needs to add new users/key devices to the system, to change which particular key devices that shall be able to access each particular lock device, to remove users/key devices from the system, etc. These needs will be all the more frequent and complicated, the bigger and more complex the access control system grows. This will be considered in more detail in a later section of this document with reference to FIG. 1.

One particularly problematic situation which needs to be handled is when a whole set of key devices, which has hitherto been defined as authorized according to the current lock access data in one or more lock devices, no longer shall be authorized but instead be replaced by a new group of key devices. If none of the key devices in the new group is previously known to a lock device, then that lock device will not be prepared to communicate with any such unknown key device and will therefore not be able to receive the updated lock access data.

Another particularly problematic situation is when a new key device is to be added to the list of authorized key devices for a particular lock device, but that lock device is only visited by an ambassador key device at infrequent occasions. This may mean that the new key device's access to the particular lock device is considerably delayed by as much as a week, month or even more.

Generally, the invention seeks to find a trade-off between two opposing interests—to allow for a flexible way of distributing sets of updated lock access data to all relevant lock devices, while maintaining security at an acceptable level.

SUMMARY OF THE INVENTION

In view of the above, an objective of the invention is to solve or at least reduce the problems discussed above.

On a conceptual level, the invention is based on the inventive insight that autonomously operating lock devices (i.e. an access control system of the above-mentioned second category) can be provided with additional functionality for requesting a key device to provide a response to a challenge made by the lock device. The challenge shall be based on a challenge code generated and/or stored locally in the lock device, and the response to the challenge shall be created by a remote administration server and shall be based on information that serves to identify the key device.

In a way, the present invention can be seen to be based upon a hybrid between the two different categories of access control systems referred to above.

In view of the above, a first aspect of the present invention therefore is an access control method in which a lock device provides conditional access to a protected environment by short-range wireless communication with a key device having a key device identifier, the method involving:

the lock device requesting the key device to provide a challenge response to a challenge generated by the lock device based on a challenge code kept by the lock device;

the lock device receiving the challenge response from the key device, wherein the challenge response is generated by a remote administration server and is based on the key device identifier of said key device, and wherein the generated response is sent to the key device and forwarded from the key device to the lock device; and the lock device verifying the received challenge response based on the challenge code and on the key device identifier of said key device.

Advantageously, the remote administration server generates the challenge response as a function of a copy of said key device identifier kept by the administration server, and the lock device detects the key device identifier during the short-range wireless communication with the key device and uses the detected key device identifier for verifying the received challenge response.

In one or more embodiments, the lock device generates the challenge by encrypting the challenge code using a key which is based on at least one of a serial number and a lock device identifier of said lock device.

In one or more embodiments, the administration server:
receives the challenge from the key device;
determines, from information received from the key device, the lock device from which the challenge originated;
searches a system database associated with the administration server to retrieve at least one of a serial number and a lock device identifier of the lock device from which the challenge originated; and
decrypts the received challenge to derive the challenge code using a key which is based on the retrieved serial number and/or lock device identifier.

In this or other embodiment(s), the administration server further:
retrieves the copy of said key device identifier by searching the system database using information received from the key device; and
generates the challenge response based on the derived challenge code and the retrieved copy of said key device identifier.

In this or other embodiment(s), the administration server further:
encrypts the challenge response by using a key which is based on the retrieved serial number and/or lock device identifier; and
sends the encrypted challenge response to the key device.

In this or other embodiments, the lock device:
receives the encrypted challenge response from the key device; and
decrypts the received encrypted challenge response by using a key which is based on at least one of the lock device serial number and the lock device identifier of said lock device.

The challenge response generated by the remote administration server may include usage restriction data, defining at least one of an expiration date/time for the challenge response, and a maximum usage limit for the challenge response.

Further, the challenge response generated by the remote administration server may include a part which is readable by the key device and which defines an expiration date/time for the challenge response, wherein the key device will prevent forwarding of the challenge response to the lock device if the expiration date/time has lapsed.

In one or more embodiments, where the lock device has a memory for storing lock access data, said lock access data including key device identifiers of key devices which are allowed to access the environment protected by the lock device, the method comprises the initial steps, performed by the lock device, of:

when the key device approaches the lock device and seeks access, detecting the key device identifier for the key device;
checking if the detected key device identifier matches the lock access data stored in the memory of the lock device; and
if no match is found in the checking step, generating said challenge and sending it to the key device.

Advantageously, the short-range wireless communication is Bluetooth® communication; wherein the lock device may detect the key device identifier by reading a Bluetooth® address assigned to a Bluetooth® transceiver used by the key device for the Bluetooth® communication with the lock device.

Embodiments of the method may operate in an "Online" mode, which means that the generated challenge is sent from the lock device to the key device when the latter seeks access but is denied this because there is no key device identifier representing that key device in the lock device's memory (i.e., the key device is unknown to the lock device). Thus, in Online mode, the generated challenge is sent from the lock device to the key device using short-range wireless communication. The key device then forwards the generated challenge to the administration server over an available communication channel, which may be a packet-based or circuit-switched communication channel over a mobile telecommunications network such as GSM, UMTS, LTE, D-AMPS, CDMA2000, FOMA or TD-SCDMA. Alternatively or additionally, the communication channel may comply with a wireless data communication standard such as WLAN (Wireless Local Area Network).

Alternatively or additionally, embodiments of the method may operate in an "Offline" mode. In Offline mode, a challenge code in instead transferred in advance from the lock device to the administration server. This may for instance occur in an initial batch of pre-generated challenge codes generated in or for the lock device already at the time of manufacturing, assembling or installation, or in a subsequent batch of challenge codes which are generated by the lock device, when the initial batch has run out, and communicated to the administration server by way of another, trusted and allowed key device when it seeks and gets access at the lock device.

Thus, in Offline mode, the lock device in advance generates one or more challenge codes, stores the challenge code(s) in local memory, and communicates the challenge code(s) to the administration server for storage in a system database;

the key device in advance requests and receives a pre-generated challenge response from the administration server, and stores the received pre-generated challenge response in local memory;

when generating the requested pre-generated challenge response to be sent to the key device, the administration server retrieves and uses any one of the challenge code(s) of the lock device from the system database;

when the key device approaches the lock device and seeks access, and is requested by the lock device to provide a challenge response, the key device responds by retrieving the pre-generated challenge response from local memory, and sending it to the lock device.

In Offline mode, the lock device may verify the received challenge response by producing a candidate challenge response from each challenge code stored in its local memory and the key device identifier of said key device, and matching the received challenge response against all produced candidate challenge responses.

Advantageously, the Online and Offline modes may be used in the same embodiment where the lock device, key device and administration server are capable of operating in the Online mode or in the Offline mode, depending on whether or not the key device can access the administration server at the moment when it seeks access to the lock device.

Further features of the method according to the first aspect of the invention are defined in the attached dependent claims.

A second aspect of the present invention is a lock device for use in an access control system which involves a plurality of lock devices, a plurality of key devices, each key device having a key device identifier, and an administration server having an associated system database which defines the conditions under which individual ones of the key devices may be granted access to protected environments by individual ones of the lock devices. The lock device has:

a transceiver for short-range wireless communication with a key device among said plurality of key devices;

a memory;

means for detecting the key device identifier of said key device during the short-range wireless communication with the key device;

means for generating a challenge code to be stored in said memory;

means for generating a challenge based on said challenge code;

means for causing said transceiver to send the generated challenge to said key device;

means for receiving a challenge response from the key device, wherein the challenge response originates from the administration server;

means for verifying the received challenge response based on the challenge code in said memory and on the detected key device identifier of said key device; and means for determining whether conditional access may be given to the key device based on an output from said means for verifying.

In addition, the second aspect of the present invention may comprise means or other structural elements capable of performing any of the lock device functions referred to above for the method according to the first aspect.

A third aspect of the present invention is an administration server for use in an access control system which furthermore includes a plurality of lock devices and a plurality of key devices, each key device having a key device identifier. The administration server has:

a system database which is associated with the administration server, wherein the system database defines the conditions under which individual ones of the key devices may be granted access to protected environments by individual ones of the lock devices;

means for receiving a challenge from a key device among said plurality of key devices over a communication network, wherein the challenge originates from a lock device, among said plurality of lock devices, to which the key device has sought access;

means for retrieving a copy of the key device identifier of said key device by searching the system database using information received from the key device;

means for deriving a challenge code from the received challenge;

means for generating a challenge response based on the derived challenge code and the retrieved copy of the key device identifier; and means for sending the generated challenge response to said key device over said communication network.

In addition, the third aspect of the present invention may comprise means or other structural elements capable of performing any of the administration server functions referred to above for the method according to the first aspect.

Other objectives, features and advantages of the present invention will appear from the following detailed disclosure as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objectives, features and advantages of the present invention, will be better understood through the following illustrative and non-limiting detailed description of embodiments of the present invention, reference being made to the appended drawings.

DETAILED DESCRIPTION OF EMBODIMENTS

Figure 1:
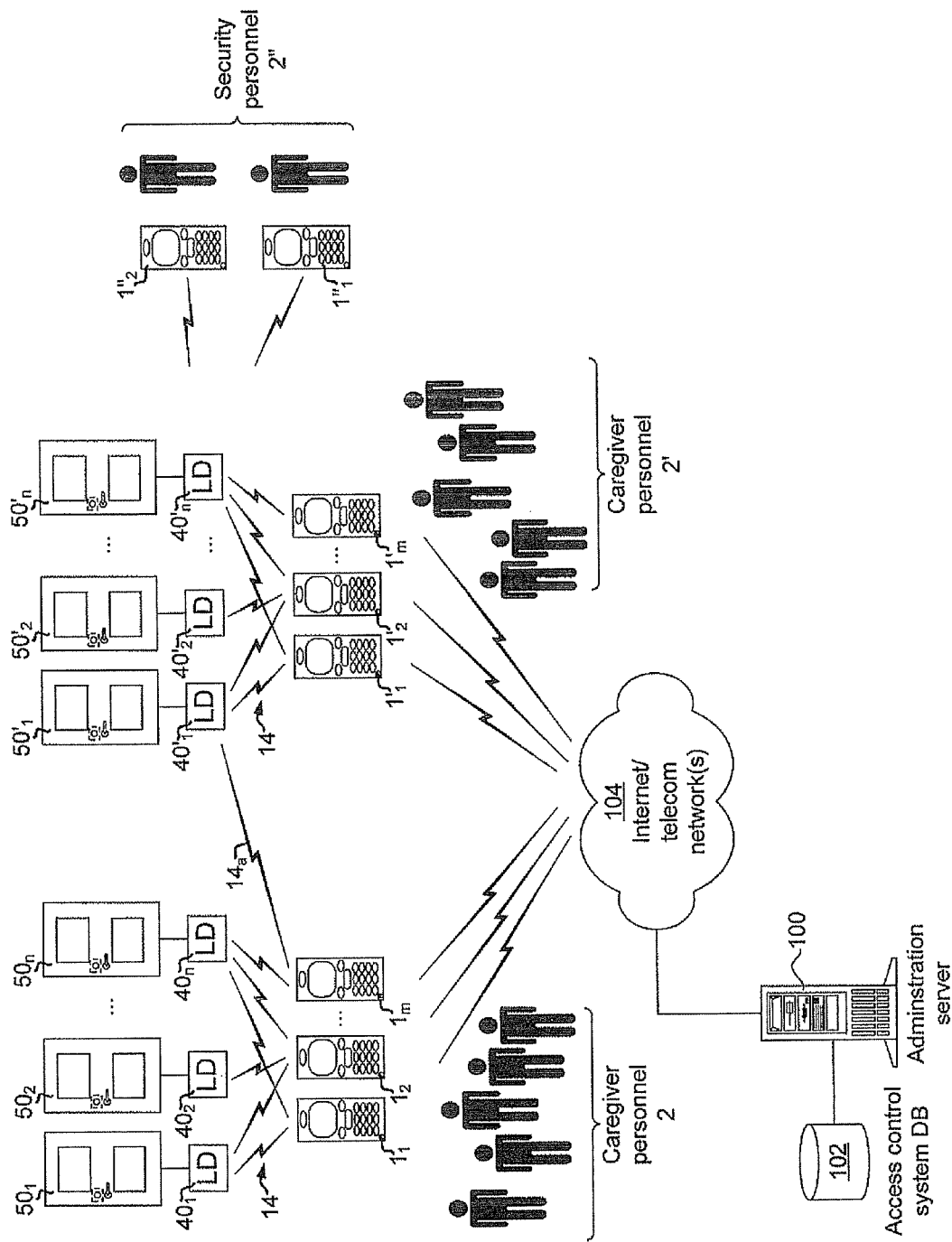
FIG. 1 is a schematic view of an access control system in which embodiments of the present invention may be exercised.

FIG. 1 illustrates, in a schematic and simplified form, the layout of an access control system for elderly care. A first team of caregiver personnel 2 is responsible for the elderly care of a first group of caretakers, all living in rooms or apartments covered by respective front doors $50_1$-$50_n$. Lock devices $40_1$-$40_n$ are installed on the respective front doors $50_1$-$50_n$ and serve as gateways to the respective protected environment (i.e. room or apartment) behind each door. A first pool of key devices $1_1$-$1_m$ is available to the first team of caregiver personnel 2. The key devices $1_1$-$1_m$ may be mobile terminals. Each lock device $40_1$-$40_n$ contains lock access data which includes the key device identifiers of the key devices $1_1$-$1_m$ which are allowed to access the lock device in question.

When a user in the first team starts his shift, he will check out one of the key devices $1_1$-$1_m$ from a caregiver central, for instance key device $1_1$. During his shift, he will use key device $1_1$ to gain access to various ones of the front doors $50_1$-$50_n$ to provide the care required by the respective caretakers. This access will be provided by way of Bluetooth® communication between key device and lock device, as indicated at 14 in FIG. 1. Therefore, the key device identifiers mentioned above may advantageously be represented by the unique Bluetooth® addresses assigned to the Bluetooth® transceivers in the respective key devices.

At the end of his shift, the user will again check in and return the key device $1_1$ to the caregiver central. In addition or alternatively, some or all members of the first team of caregiver personnel 2 may use their own mobile terminals as key devices. Not all key devices or members of the first team of caregiver personnel 2 may be authorized to access all doors, and they need not all have the same level of authorization in terms of times and/or dates when access is allowed.

The access control system of FIG. 1 further involves a second team of caregiver personnel 2' responsible for serving a second group of caretakers, the rooms or apartments of which have respective front doors $50'_1$-$50'_n$ to which lock devices $40'_1$-$40'_n$ are installed. A second pool of key devices $1'_1$-$1'_m$ is available to the second team of caregiver personnel 2'. Of course, the access control system may in reality include additional teams of caregiver personnel, additional groups of caretakers, additional front doors, additional lock devices, and additional pools of key devices.

In addition, security personnel 2" with key devices $1''_1$-$1''_2$ are included in the system. Whereas the key devices $1_1$-$1_m$, $1'_1$-$1'_m$ of the first and second teams 2, 2' will be used by a relatively large number of caregiver persons to access a relatively small number of lock devices/doors at relatively frequent occasions, the situation is the opposite for the key devices $1''_1$-$1''_2$ of the security personnel 2". These key devices will be used by a limited number of persons (such as nurses or guards) at rare occasions, but they nevertheless need to be able to access a very large number of lock devices/doors—or even all lock devices/doors that are included in the access control system.

For enhanced security, each key device runs an access control software application in which the user must log on. Also, all communications with the lock devices are encrypted. Further, not all users/key devices are allowed to bring updated lock access data to the lock devices. Rather, in the embodiment of FIG. 1, a subset of particularly trusted users/key devices are designated as ambassadors; only these will be allowed to bring updated lock access data to the lock devices.

Each team of caregiver personnel 2, 2' may be sub-divided into sub-groups, for instance a day shift, an evening shift and a night shift. Also, an individual user may act in or for both teams 2 and 2' (for instance to serve as back-up in situations of sickness, parental leave or during popular holiday periods), therefore having a need to use his key device for accessing lock devices both in the first group of caretakers and in the second group of caretakers. This is illustrated in FIG. 1 for key device $1_m$, which will access not only lock device $40_m$ in the first group of caretakers, but also lock device $40'_1$ in the second group of caretakers (see arrow 14a).

Because of the complex situation in the access control system, it is apparent that given the very large number of key devices and lock devices involved, it is a difficult and complex problem to keep the lock access data in the various lock devices appropriately updated to reflect changes among the users (caregiver personnel and security personnel), so that, in each given situation, a certain lock devices makes a correct decision as to whether or not a user of a certain key device shall be granted access.

Figure 2:
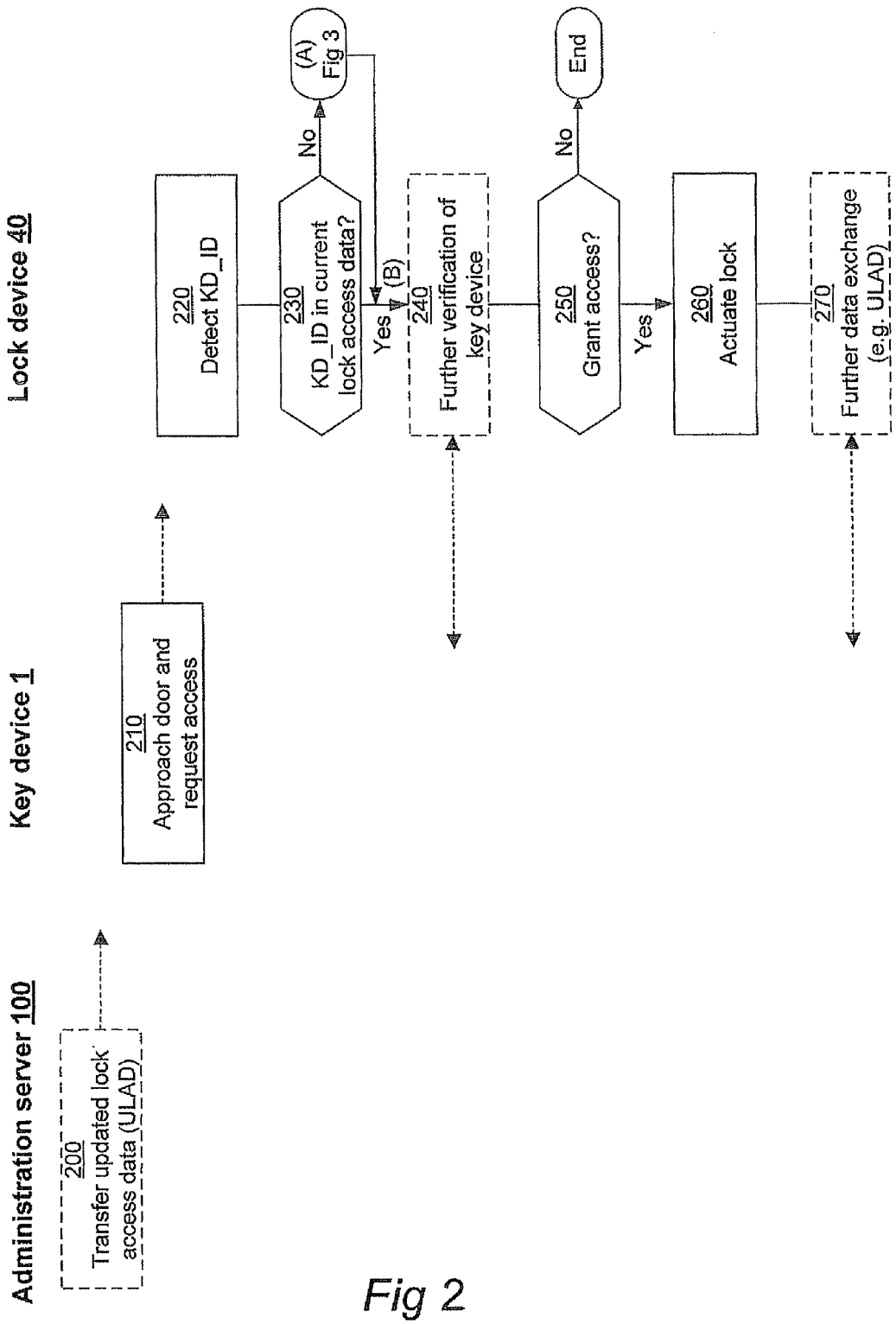
FIG. 2 illustrates an access control method which may be performed in the access control system of FIG. 1.
Figure 3A:
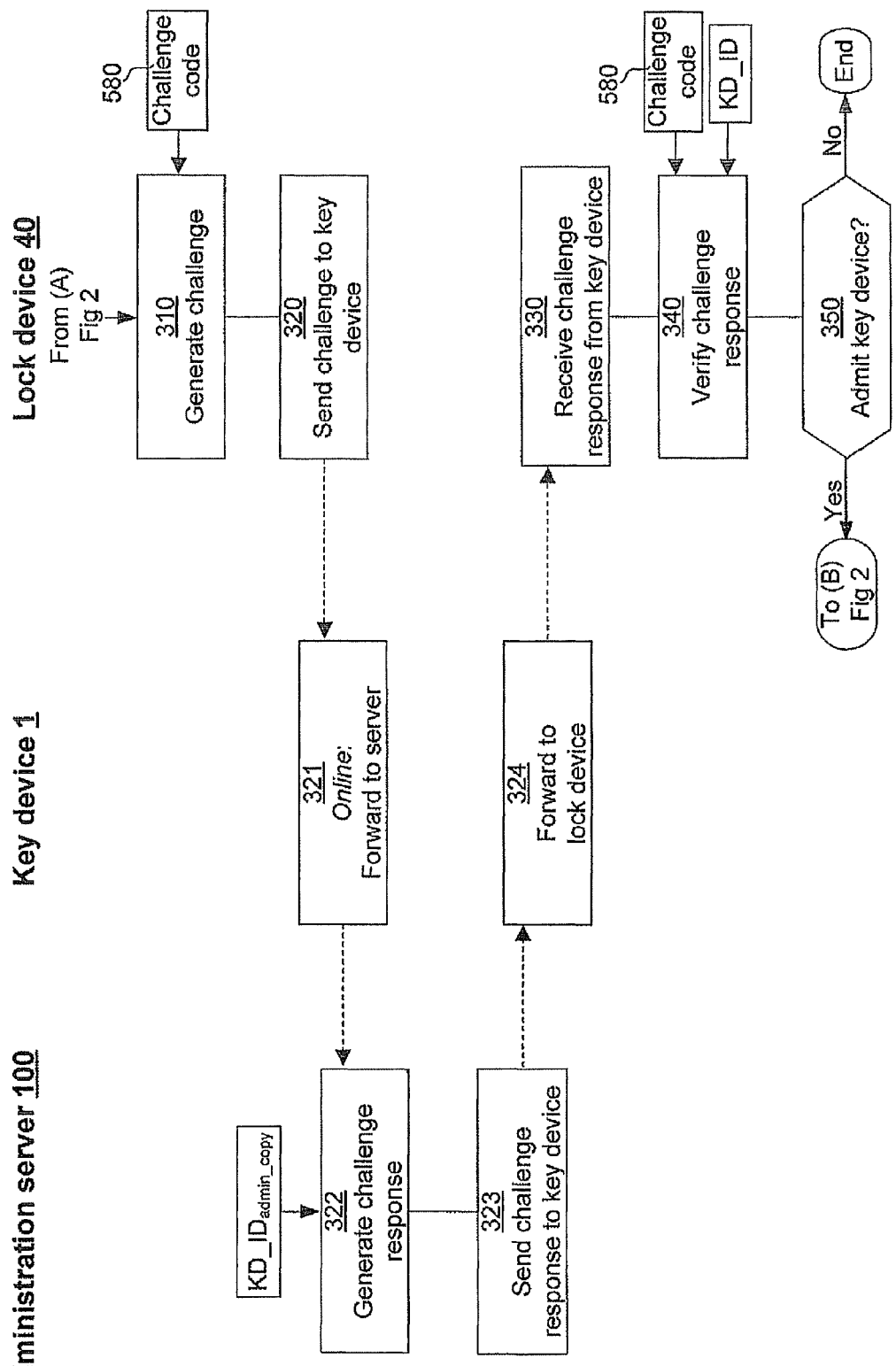
FIG. 3a is a schematic flowchart of an access control method according to one embodiment, operating in Online mode.
Figure 3B:
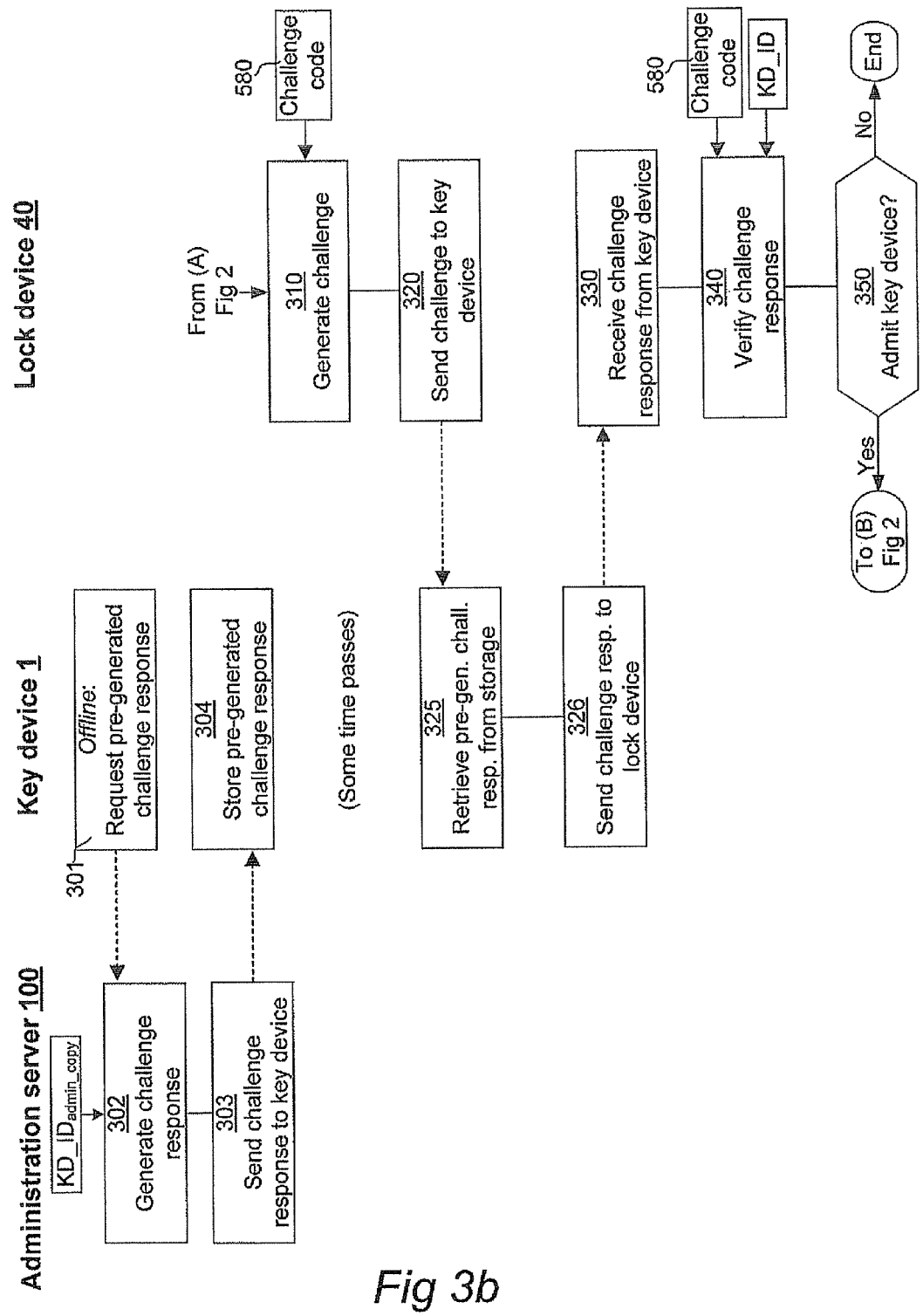
FIG. 3b is a schematic flowchart of an access control method according to one embodiment, operating in Offline mode.
Figure 4:
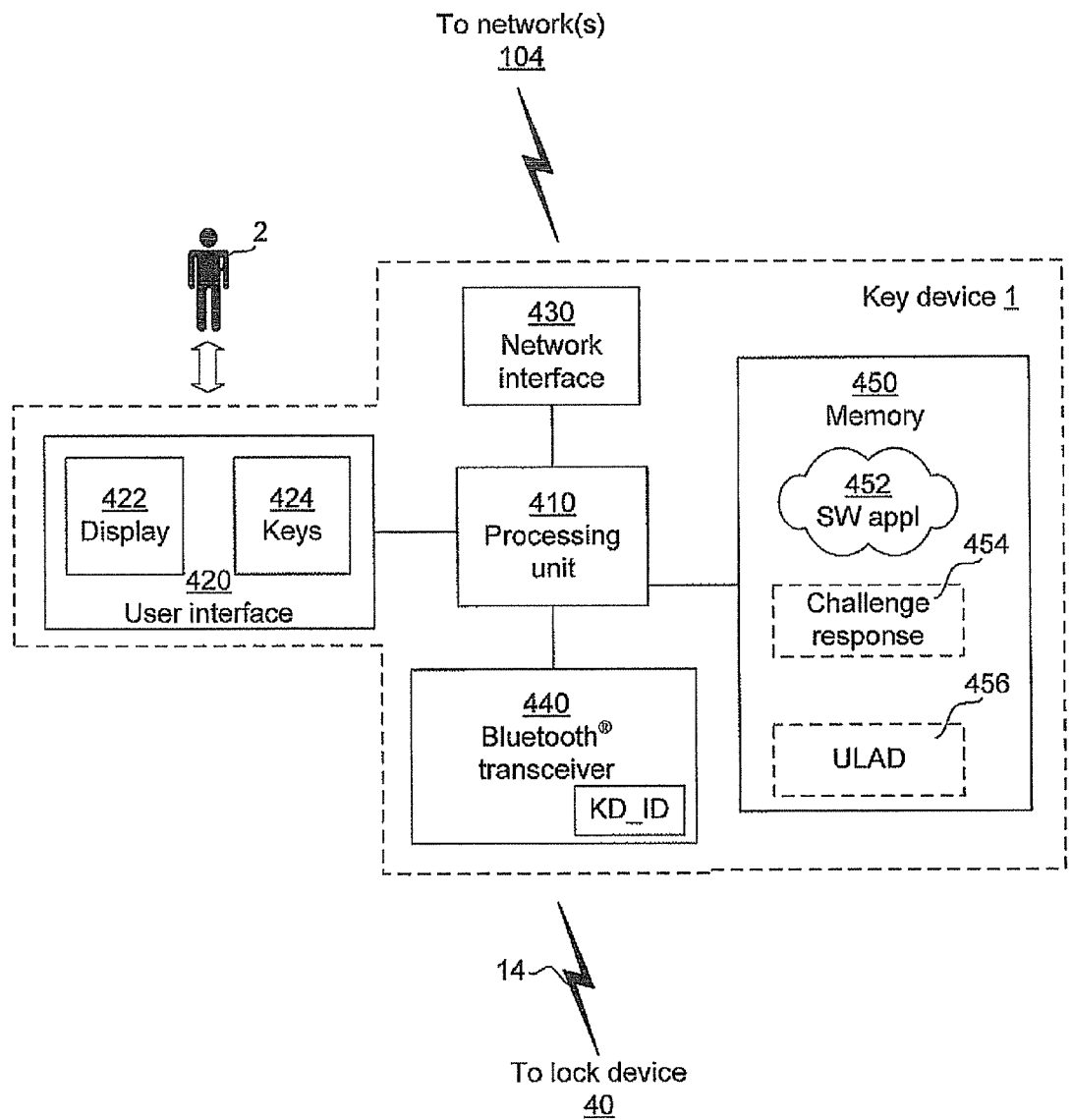
FIG. 4 is a schematic block diagram of a key device which may interact with a lock device in the access control system of FIG. 1.
Figure 5:
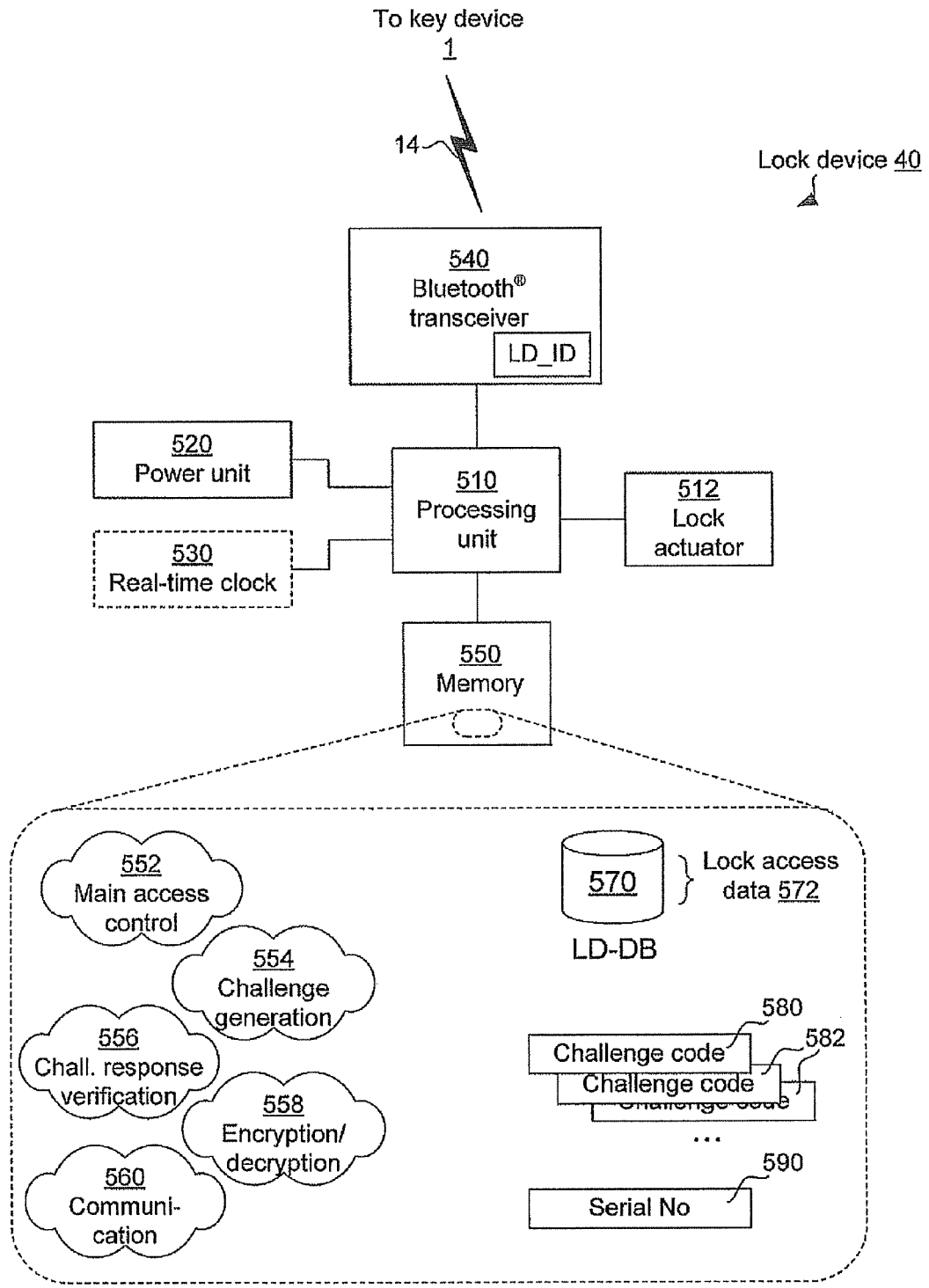
FIG. 5 is a schematic block diagram of a lock device according to one embodiment.

FIGS. 2 and 3a-3b illustrate how the invention provides a solution to this difficult and complex problem, for the embodiment shown in FIG. 1. In FIG. 2, it is assumed that one of the key devices $1_1$-$1_m$, $1'_1$-$1'_m$ approaches one of the lock devices $40_1$-$40_n$, $40'_1$-$40'_n$ in step 210. This individual key device is referred to as key device, or KD, 1 in the following, and the main components of the key device 1 are shown in FIG. 4. The corresponding individual lock device is referred to as lock device, or LD, 40, and its main components are shown in FIG. 5. The individual caregiver person that uses the key device 1 is referred to as user 2. At some earlier point in time, the key device 1 may have received updated lock access data (ULAD) 456 in a step 200 from the administration server 100 in FIG. 1.

In the embodiment disclosed in FIG. 4, the key device 1 is a mobile terminal, e.g. a cellular telephone, personal digital assistant (PDA), smart phone, etc., which is capable of communicating with a telecommunications system. Thus, the user 2 may use the key device 1 for various telecommunication services, such as voice calls, Internet browsing, video calls, data calls, facsimile transmissions, still image transmissions, video transmissions, electronic messaging, and e-commerce. Generally, these telecommunication services are not central within the context of the present invention; there are no limitations to any particular set of services in this respect. Therefore, only components which are somehow pertinent to the inventive functionality are shown in FIG. 4.

As seen in FIG. 4, the key device 1 has a network interface 430 for connecting to the Internet/telecommunications network(s) 104. The network interface 430 may comply with any commercially available mobile telecommunications standard, including but not limited to GSM, UMTS, LTE, D-AMPS, CDMA2000, FOMA and TD-SCDMA. Alternatively or additionally, the network interface 430 may comply with a wireless data communication standard such as WLAN (Wireless Local Area Network).

The key device 1 also has a man-to-machine interface (MMI), or user interface (UI) 420, which may include a display 422 and a set of keys 424 or other input device, as well as other known UI elements like a speaker and a microphone. The user 2 may control the operation of, and exchange data with, the key device 1 over the user interface 420.

Further, the key device 1 has an interface 440 for short-range wireless data communication. In the disclosed embodiment of FIG. 4, the interface 440 comprises a Bluetooth® transceiver, by means which the key device 1 can communicate with, for instance, the lock device 40 over the Bluetooth® link 14. The Bluetooth® transceiver is assigned a unique Bluetooth® address KD_ID, the meaning of which has already been explained above. Alternatively or additionally, the interface 440 may for instance comprise transceiver components for IrDA (Infrared Data Association), WLAN or NFC (Near Field Communication).

A processing unit 410 is overall responsible for the operation and control of the different components of the key device 1. The processing unit 410 may be implemented in any known controller technology, including but not limited to a processor (PLC, CPU, DSP), FPGA, ASIC or any other suitable digital and/or analogue circuitry capable of performing the intended functionality.

Finally, the key device 1 has a memory 450 which is operatively connected to the processing unit 410. The memory 450 may be implemented by any known memory technology, including but not limited to E(E)PROM, S(D)RAM and flash memory, and it may also include secondary storage such as a magnetic or optical disc. Physically, the memory 450 may consist of one unit or a plurality of units which together constitute the memory 450 on a logical level. In addition to storing various program instructions and data for the various functions and applications which are typically available in a mobile terminal, the memory 450 also comprises the program instructions 452 and work data for the aforementioned access control software application. Also, any updated lock access data received in step 200 will be buffered in the memory 450, as seen at 456.

With reference to FIG. 5, the lock device 40 generally comprises the following main components. A processing unit 510 is overall responsible for the operation and control of the different components of the lock device 40. The processing unit 510 may be implemented in any known controller technology, including but not limited to a processor (PLC, CPU, DSP), FPGA, ASIC or any other suitable digital and/or analogue circuitry capable of performing the intended functionality.

The lock device 40 of this embodiment is a stand-alone, autonomously operating device which requires no wire-based installations, neither for communication nor for power supply. Instead, the lock device 40 is powered solely by a local power unit 520 which comprises one ore more long-life batteries. It interacts with key devices, as already mentioned, by wireless activities. The lock device 40 therefore has an interface 540 for short-range wireless data communication. In the disclosed embodiment of FIG. 5, the interface 540 comprises a Bluetooth® transceiver, by means which the lock device 40 can communicate with, for instance, the key device 1 over the Bluetooth® link 14. The Bluetooth® transceiver is assigned a unique Bluetooth® address LD_ID. Alternatively or additionally, the interface 540 may for instance comprise transceiver components for IrDA, WLAN or NFC.

The lock device 40 of the disclosed embodiment further includes a real-time clock 530 capable of providing the processing unit 510 with an accurate value of the current time. However, embodiments are also possible where no real-time clock is provided.

Finally, the lock device 40 has a memory 550 which is operatively connected to the processing unit 510. The memory 550 may be implemented by any known memory technology, including but not limited to E(E)PROM, S(D)RAM and flash memory, and it may also include secondary storage such as a magnetic or optical disc. Physically, the memory 550 may consist of one unit or a plurality of units which together constitute the memory 550 on a logical level. The memory 550 serves to store various program instructions and work data for functions to be performed by the processing unit 510 in order to carry out the tasks of the lock device 40. For instance, these program instructions define a main access control module or means 552 which is responsible for the general parts of the lock device-side functionality shown in FIGS. 2, 3a and 3b. There is also a challenge generation module or means 554 (cf step 310, FIGS. 3a-3b), a challenge response verification module or means 556 (cf step 340, FIGS. 3a-3b), an encryption/decryption module or means 558, and a communication module or means 560 which handles all communication with key devices in cooperation with the interface 540.

Moreover, the memory 550 serves to store a local lock device database (LD-DB) 570, which includes lock access data 572 upon which the access control decisions are based (cf steps 230 and 250 in FIG. 2). The lock device database 570 may also store status and log file data which are referred to further below (cf step 270 in FIG. 2). Also, the memory 550 serves to store a challenge code 580 generated by the lock device, and in some embodiments also a plurality of additional challenge codes 582. The lock device 40 has a serial number which was assigned during manufacturing, assembly, delivery or installation. This serial number is also stored in the memory 550, as seen at 590.

For further implementation details and possible additional components of the lock device 40, reference is made to the aforementioned WO 2006/098690, which is fully incorporated herein by reference.

Referring back to step 210 in FIG. 2, when the user 2 has brought his key device 1 near the door 50 which is protected by the lock device 40, the user may request access by issuing a command in the user interface of the key device 1, e.g. by invoking a function in the aforementioned access control software application. In alternative embodiments, this may instead occur automatically. For instance, if the lock device 40 has access to the output signal of a presence sensor on or at the door 50, the lock device 40 may detect the presence of the user 2 and in response trigger performance of the remaining steps. As further alternatives, the key device 1 or the lock device 40 may be configured to regularly transmit beacon signals (e.g. Bluetooth® inquiries) which may be detected and responded to by the other device.

In a following step 220, the lock device 40 will detect the key device identifier KD_ID by reading, from the Bluetooth® communication traffic between the devices, the Bluetooth® address assigned to the Bluetooth® transceiver 440 in the key device 1. It is to be noticed that it is not necessary to wait until a bidirectional Bluetooth® link has been established in order to detect the Bluetooth® address of the key device 1, since the Bluetooth® address is included in and can be read already from the initial Bluetooth® messages which are sent between the devices e.g. during paging, handshaking and initiation.

Then, in a step 230, the lock device 40 will check if the detected key device identifier KD_ID matches the lock access data 572 currently stored in its internal memory 550. If so, the lock device 40 considers the key device 1 as a known key device and proceeds to an optional step 240, in which further verification of the key device 1 may take place. Such further verification may include establishing and further communicating over a bidirectional Bluetooth® link 14 between the lock device 40 and key device 1. For instance, the access control software application in the key device 1 may prompt the user to enter a PIN code on a keypad of the key device 1, and the PIN code may be communicated over the Bluetooth® link to the lock device 40, which may compare the received PIN code with a prestored PIN code associated with the key device identifier KD_ID in the lock access data 572. Alternatively or additionally, the user 1 may provide some biometric data, such as a scanned fingerprint, by means of the key device 1, to be evaluated by the lock device 40 upon receipt.

In a subsequent step 250, the lock device 40 determines whether or not the key device 1/user 2 shall be granted access or not. This may involve checking that the KD_ID of the key device 1 was recognized in step 230 as a known KD_ID which is not included in a "black list" of blocked key device identifiers in the lock access data 572. If the optional step 240 is applied, the determination in step 250 will also include a check that the further verification in step 240 was successful.

A favorable decision in step 250 will trigger a step 260 in which the actual access in made to happen. This may involve actuating an electric motor to displace a lock plunger or other mechanism to an unlocked position, or releasing a latch mechanism so that it will no longer prevent manual or automatic opening of the door 50. This is collectively referred to as lock actuator 512 in FIG. 5.

Finally, an optional step 270 may be performed, in which further data exchange may take place. This may involve transfer from the lock device 40 to the key device 1 of the log file and status data recorded by the lock device regarding for instance previous attempts by key devices to access the protected environment. Additionally or alternatively, the further data exchange may involve transfer from the key device 1 to the lock device 40 of the updated lock access data 456 which was previously received in step 200, this updated lock access data being intended to replace or upgrade the existing lock access data 572 in the local lock device database 570 held by the lock device 40 in its memory 550.

An unfavorable decision in step 250 will instead result in termination of the procedure of FIG. 2, without any performance of step 260.

This far, the description of FIG. 2 essentially corresponds to the disclosure in the aforementioned WO 2006/098690, in which the skilled person will find any implementation details not explicitly mentioned in the present patent application. The novel and inventive functionality will now be described.

In step 230, if the result of the check is that the detected key device identifier KD_ID does not match the lock access data 572 currently stored in the internal memory 550 of the lock device 40, this means that the key device 1 is unknown to the lock device 40. This situation will trigger a challenge procedure which is shown in FIGS. 3a and 3b.

The main steps of the challenge procedure in FIGS. 3a and 3b are the following.

In step 310, a challenge is generated by the lock device 40. The generated challenge is based on the challenge code 580. The challenge code 580 may be generated by the lock device 40 "on the fly", i.e. when needed for step 310, or in advance.

The generated challenge code 580 is stored in the internal memory 550 of the lock device 40.

In step 320, the generated challenge is sent to the key device 1 over the Bluetooth® link 14. The key device 1 will then either act in accordance with a first mode of operation, which is referred to as "Online" throughout this document and which is illustrated in FIG. 3a, or it will act in accordance with a second mode of operation, which is referred to as "Offline" (FIG. 3b). The Online mode typically applies when the key device 1 has momentary access to the communication network(s) 104 and therefore also to the administration server 100. Conversely, the Offline mode typically applies when the key device 1 does not have momentary access to the communication network(s) 104 and therefore cannot reach the administration server 100 for the time being. Particulars of the Online and Offline modes are described in more detail in later sections of this document, but these modes can be summarized in the following way:

As seen in step 321 in FIG. 3a, in the Online mode, the key device 1 will forward the challenge to the administration server 100 over the communication network(s) 104, thereby in effect making a request for a challenge response. The administration server 100 will generate a challenge response in step 322, and send the generated challenge response to the key device 1 in step 323 over the communication network(s) 104. Upon receipt, the key device 1 will forward the challenge response to the lock device 40 in step 324 over the Bluetooth® link 14.

In the Offline mode shown in FIG. 3b, there will be no communication with the administration server 100 at the moment in time when steps 310 and 320 are performed (i.e. when the key device 1 has approached the lock device 40 and requests access). Instead, at some earlier point in time, the user 2 of the key device 1 will make a request over the communication network(s) 104 for a pre-generated challenge response from the administration server 100 (step 301). In response, the administration server 100 will generate the challenge response in step 302, using in this case a previously stored copy of a valid challenge code for the lock device 40. This copy will have been generated in advance by the lock device 40 (e.g. already during the manufacturing of the system, i.e. prior to delivery and installation), and communicated to the administration server 100 for storage in the system database 102.

The pre-generated challenge response is sent to the key device 1 in step 303 over the communication network(s) 104. Upon receipt, the key device 1 will store the pre-generated challenge response in its internal memory 450 in step 304, as seen at 454 in FIG. 4. In alternative embodiments, the pre-generated challenge response may be created and sent to the key device 1 on the administration server's 100 own initiative, rather than in response to a request from the key device 1.

Later on, when the lock device 40 sends the generated challenge to the key device 1 over the Bluetooth® link 14 in step 320, the key device 1 will react in step 325 by retrieving the stored pre-generated challenge response from location 454 in its internal memory 450. Then, the key device 1 will send the pre-generated challenge response to the lock device 40 in step 326 over the Bluetooth® link 14.

One important feature of the challenge response (in Online mode as well as Offline mode) is that it, in some way, is based on (e.g. is a function of, or otherwise depends on or reflects) the key device identifier of the key device 1. In a particularly advantageous embodiment, the remote administration server 100 keeps a copy $KD\_ID_{admin\text{-}copy}$ of each key device identifier for the various key devices $1_1$-$1_m$, $1'_1$-$1'_m$ in the system (e.g. by storing such copies in the access control system database 102 or other parts of its memory). When generating the challenge response in step 322 or 302, the administration server 100 will read and use this copy KD_ID$_{admin\_copy}$ of the key device identifier for the particular key device 1.

In step 330, the lock device 40 will use the Bluetooth® link 14 to receive the challenge response from the key device 1. Then, in step 340 the lock device 40 will verify the received challenge response based primarily on i) the challenge code 580 which is stored in the internal memory 550 of the lock device 40, and ii) the key device identifier of the key device 1. This is handled by the processing unit 510 which will invoke the challenge response verification means 556. In the particularly advantageous embodiment mentioned above, the lock device 40 will detect the key device identifier KD_ID of the key device 1 sometimes during the Bluetooth® communication between lock device 40 and key device 1, i.e. for instance in step 220, 320 or 330. The lock device 40 will use the detected key device identifier KD_ID for verifying the received challenge response in step 340. This is a security advantage, since the challenge response (as generated by the administration server 100) is based on a remotely stored copy of the key device identifier, whereas the verification of the challenge response by the lock device 40 will be based on the "real" key device identifier as detected during actual communication with the key device. Therefore, a malicious attempt to use another key device than the one that is the rightful owner of the key device identifier KD_ID is likely to be detected in the verification step 340. A favorable output or result from the verification step 340/challenge response verification means 556 is therefore issued when the lock device 40 concludes that the challenge response is as expected and that, conclusively, the administration server 100 has approved that the key device 1 shall be given access to the lock device 40.

In step 350, the lock device 40 determines—based on the output of the verification step 340/challenge response verification means 556—whether or not the key device 1 can be regarded as trusted, even though the key device 1 was a priori unknown to the lock device 40. Therefore, in case of a favorable verification result in step 340, the execution will continue to node (B) in FIG. 2, whereupon the optional further verification of the key device 1 may take place in step 240, followed by the access determination step 250, lock actuation step 260 and further data exchange step 270. In other words, a key device 1 which is a priori unknown to a lock device may prove its trustiness by presenting to the lock device 40 a challenge response that the lock device relies on.

On the other hand, in case of a negative verification result in step 340, the execution in step 350 may cause the key device 1 to be blocked from further access to the lock device 40. This may be done by storing the key device identifier KD_ID of the key device 1 in a black list in the lock access data 572. A key device which has been blocked by a lock device may then require an unblocking event brought about by an ambassador device to the lock device, for the key device to be removed again from the black list.

Some of the key steps of the mode referred to as Online above will now be described in more detail.

Lock Device—Generation of Challenge

The lock device 40 generates a challenge code 580 for use in step 310 in FIGS. 3a and 3b by invoking the challenge generation module 554. The challenge code 580 may be generated as an n-bit random number using a random number algorithm where the seed is a timer value (e.g. from real-time clock 530), some part of the log file and status data recorded in the local lock device database 570, etc. In one embodiment, n=256.

Lock Device—Encryption of Challenge

For enhanced security in the access control system, the communication between lock device 40 and administration server 100 is encrypted by the sender and decrypted by the receiver. As regards the lock device 40, the encryption/decryption module 558 handles this by applying an encryption/decryption algorithm or standard which is known also to the administration server 100. One embodiment applies AES (Advanced Encryption Standard), using an encryption/decryption key which is based on a standard function known as SHA256 (Secure Hash Algorithm 256). In more detail, the encryption/decryption key is calculated as the output of SHA256(Algorithm1 (serial No 590, LD_ID)), where Algorithm1 should be known only to the administration server and the lock devices in the system. The challenge sent in step 320 is then generated by AES-encrypting the generated challenge code with the encryption/decryption key.

Using both the lock device serial number 590 and the lock device identifier LD_ID (i.e. the unique Bluetooth® address of the lock device's Bluetooth® transceiver 540) represents a high level of security, since both of these parameters are very unlikely to be known by anyone else but the administration server 100. However, other embodiments may use just one of the lock device serial number 590 and the lock device identifier LD_ID for the calculation of the encryption/decryption key.

Administration Server—Decryption of Challenge

When key device 1 forwards the challenge to the administration server 100 in step 321, the access control software application 452 in the key device 1 will also provide sufficient information for the administration server 100 to determine the lock device from which the challenge originated (in this case lock device 40) and to which the challenge response therefore is to be directed. The administration server 100 will search the system database 102 and retrieve further information about the lock device 40. This further information includes the serial number and the lock device identifier of the lock device 40, and it will be used by the administration server 100 to calculate an encryption/decryption key as the output of SHA256(Algorithm1(retrieved lock device serial number, retrieved lock device identifier)). The administration server 100 will then decrypt the received challenge by applying the same encryption/decryption algorithm (AES) as the lock device 40 did, using the calculated encryption/decryption key. Thus, this decryption will derive the challenge code. Of course, in embodiments which use only one of the lock device serial number and the lock device identifier for the encryption/decryption key at the lock device side, the same will apply to the administration server side.

Administration Server—Generation of Challenge Response

Then, the administration server 100 will generate the challenge response in step 322. The challenge response chlg_resp_1 will be generated by using an Algorithm2 which should be known only to the administration server and the lock devices in the system. The input parameters of Algorithm2 include the challenge code and the key device identifier of key device 1. As already explained in conjunction with FIG. 3a above, the key device identifier of the key device 1 will be given by searching the system database 102 and retrieving the copy KD_ID$_{admin\_copy}$ of the key device identifier for key device 1. Sufficient information for this database search will be provided by the access control software application 452 in the key device 1 in step 321. Since the user 2 will have logged in to the software application 452, his identity will be known. By keeping in the system database 102 a cross-reference list between user login identities and corresponding key device identifiers, the correct copy KD_ID$_{admin\_copy}$ can be retrieved in step 322 by the administration server 100. To this end, the server 100 will make a check that the user 2 is authorized to access the lock device 40 according to data in the system database 102 which defines the conditions under which individual ones of the key devices may be granted access to environments 50 protected by individual ones of the lock devices in the access control system.

Advantageously, the generated challenge response also depends on the lock device identifier, LD_ID, of the lock device 40, as found in the system database 102. In other words, an additional input parameter of Algorithm2 may be the lock device identifier.

In addition, the generated challenge response may include usage restriction data. The usage restriction may include an expiration date/time which defines the date/time when the challenge response may be used at the latest by a key device seeking access to a lock device, or a limit on the maximum number of times the challenge response may be used by a key device, or both.

Particularly for embodiments where the lock device does not include a real-time clock 530 (thereby preventing the lock device 40 from evaluating a usage restriction in terms of an expiration date/time), the generated challenge response may include a part which is based on the key device identifier KD_ID of the key device 1. This will allow the software application 452 in the key device to check the received challenge response in step 324 for any usage restriction included therein, and use its own real-time clock (or a network-based clock service) to determine whether the expiration date/time has lapsed. If so, the challenge response will not be forwarded by the key device 1 to the lock device 40. Since the encryption/decryption algorithm and key should not be known to intermediate devices like the key device 1, this part of the generated challenge response should only depend on the key device identifier KD_ID, which of course, is known to the key device 1.

Administration Server—Encryption of Challenge Response

The generated challenge response is encrypted by applying AES, using an encryption/decryption key calculated from SHA256(Algorithm3(lock device serial No, LD_ID)), where Algorithm3 should be known only to the administration server and the lock devices in the system. Algorithm3 may be identical to or different from Algorithm1. The encrypted challenge response is sent to the key device 1 in step 323, as previously explained.

Lock Device—Decryption of Challenge Response

When the lock device 40 receives the challenge response in step 330, it will decrypt it by applying the same encryption/decryption algorithm (AES) and using the same encryption/decryption key as was used by the administration server 100. Thus, the encryption/decryption module 558 will apply AES, using an encryption/decryption key calculated from SHA256 (Algorithm3(serial No 590, LD_ID)). The decryption will reveal the challenge response chlg_resp_1 as generated by the administration server 100.

Lock Device—Verification of Challenge Response

In step 340, the challenge response verification module 556 will be invoked to verify the decrypted challenge response. Algorithm2 will be executed, with input parameters (challenge code 580, LD_ID, KD_ID) and output chlg_resp_2. The challenge code 580 will be read from the internal memory 550, and LD_ID is available from the interface 540. KD_ID has, as already explained, been detected by the lock device 40 sometimes during the Bluetooth® communication between lock device 40 and key device 1, e.g. in any of the prior steps 220, 320 or 330. In other words, the lock device 40 produces a candidate challenge response chlg_resp_2 by executing Algorithm2.

A verification result is issued in step 340 by comparing the received (and decrypted) challenge response chlg_resp_1 and the candidate challenge response chlg_resp_2. These two instances of the challenge response have been generated by the administration device and by the lock device, respectively. If they match, this means that the key device 1 has been appropriately approved by the administration server 100 for the lock device 40 in question, even though the key device 1 was a priori unknown to the lock device 40. Therefore, in case of a match, a favorable result is issued from the verification step 340.

Now, some of the key steps of the mode referred to as Offline above will now be described in more detail. Only differences with respect to the Online mode will be described.

Lock Device—Generation of Challenge Codes

In order to support offline mode, the lock device 40 will in advance generate a number of challenge codes 580, 582, using the procedure described above. These challenge codes will be stored in memory 550 and will moreover be communicated to the administration server 100 for storage in the system database 102. The challenge codes may be communicated already during the manufacturing of the system, i.e. prior to delivery and installation. Alternatively, they may be generated by the lock device 40 at some prior moment in time and communicated to the administration server 100 via an ambassador key device when visiting the lock device.

Administration Server—Generation of Challenge Response

There is of course no need for the administration server 100 to decrypt a challenge received from the key device, since no challenge will be generated by the lock device 40 in offline mode. Instead, when generating the challenge response in step 302, the administration server 100 will retrieve any of the previously stored challenge codes relating to lock device 40 from system database 102.

A challenge code may typically only be used once. Therefore, when the administration server notices that there is for instance only 1 or 2 unused challenge codes left in the system database 102 for a particular lock device, it may send an alert via an ambassador key device to the lock device in question. Sooner or later, when the lock device communicates with this ambassador key device in step 270, it may read this message and return with new generated challenge codes which are communicated back to the administration server 100 by the ambassador key device. Alternatively, the lock device may itself keep track of the number of unused challenge codes 580, 582 and generate new challenge codes as appropriate.

Lock Device—Verification of Challenge Response

In this case, the lock device 40 will not know for sure which particular challenge code 580, 582 that was used by the administration server 100 for generating the challenge response. Therefore, the lock device 40 may test the received (and decrypted) challenge response by executing Algorithm2 for all challenge codes 580, 582 to produce a candidate challenge response chlg_resp_2$_i$ for each challenge code, where i=1 . . . [No of challenge codes]. If any of these candidate challenge response chlg_resp_2$_i$ results in a match with the received challenge response chlg_resp_1, a favorable result may be issued from the verification step 340.

The invention claimed is:

1. An access control method in which a lock device provides conditional access to a protected environment by short-range wireless communication with a key device having a key device identifier, the method comprising:

the lock device requesting the key device to provide a challenge response to a challenge generated by the lock device based on a challenge code kept by the lock device;

the lock device receiving the challenge response from the key device, wherein the challenge response is generated by a remote administration server and is based on the key device identifier of said key device, and wherein the generated response is sent to the key device and forwarded from the key device to the lock device; and the lock device verifying the received challenge response based on the challenge code and on the key device identifier of said key device.

2. A method as defined in claim 1,
wherein the remote administration server generates the challenge response as a function of a copy of said key device identifier kept by the administration server, and
wherein the lock device detects the key device identifier during the short-range wireless communication with the key device and uses the detected key device identifier for verifying the received challenge response.

3. A method as defined in claim 1, wherein the lock device generates the challenge by encrypting the challenge code using a key which is based on at least one of a serial number and a lock device identifier of said lock device.

4. A method as defined in claim 1, wherein the administration server:
receives the challenge from the key device;
determines, from information received from the key device, the lock device from which the challenge originated;
searches a system database associated with the administration server to retrieve at least one of a serial number and a lock device identifier of the lock device from which the challenge originated; and
decrypts the received challenge to derive the challenge code using a key which is based on the retrieved serial number and/or lock device identifier.

5. A method as defined in claim 4, wherein the administration server further:
retrieves the copy of said key device identifier by searching the system database using information received from the key device; and
generates the challenge response based on the derived challenge code and the retrieved copy of said key device identifier.

6. A method as defined in claim 5, wherein the administration server further:
encrypts the challenge response by using a key which is based on the retrieved serial number and/or lock device identifier; and
sends the encrypted challenge response to the key device.

7. A method as defined in claim 6, wherein the lock device:
receives the encrypted challenge response from the key device; and
decrypts the received encrypted challenge response by using a key which is based on at least one of the lock device serial number and the lock device identifier of said lock device.

8. A method as defined in claim 1, wherein the challenge response generated by the remote administration server includes usage restriction data, defining at least one of an expiration date/time for the challenge response, and a maximum usage limit for the challenge response.

9. A method as defined in claim 1, wherein the challenge response generated by the remote administration server includes a part which is readable by the key device and which defines an expiration date/time for the challenge response, wherein the key device will prevent forwarding of the challenge response to the lock device if the expiration date/time has lapsed.

10. A method as defined in claim 1, the lock device having a memory for storing lock access data, said lock access data including key device identifiers of key devices which are allowed to access the environment protected by the lock device, wherein the method comprises the initial steps, performed by the lock device, of:
when the key device approaches the lock device and seeks access, detecting the key device identifier for the key device;
checking if the detected key device identifier matches the lock access data stored in the memory of the lock device; and
if no match is found in the checking step, generating said challenge and sending it to the key device.

11. A method as defined in claim 2,
wherein the short-range wireless communication is Bluetooth® communication; and
wherein the lock device detects the key device identifier by reading a Bluetooth® address assigned to a Bluetooth® transceiver used by the key device for the Bluetooth® communication with the lock device.

12. A method as defined in claim 1, wherein
the lock device in advance generates one or more challenge codes, stores the challenge code(s) in local memory, and communicates the challenge code(s) to the administration server for storage in a system database;
the key device in advance requests and receives a pre-generated challenge response from the administration server, and stores the received pre-generated challenge response in local memory;
when generating the requested pre-generated challenge response to be sent to the key device, the administration server retrieves and uses any one of the challenge code(s) of the lock device from the system database;
when the key device approaches the lock device and seeks access, and is requested by the lock device to provide a challenge response, the key device responds by retrieving the pre-generated challenge response from local memory, and sending it to the lock device.

13. A method as defined in claim 12, wherein the lock device verifies the received challenge response by producing a candidate challenge response from each challenge code stored in its local memory and the key device identifier of said key device, and matching the received challenge response against all produced candidate challenge responses.

* * * * *